United States Patent
Kuramoto et al.

(10) Patent No.: US 6,455,659 B1
(45) Date of Patent: Sep. 24, 2002

(54) CRYSTALLINE POLYPROPYLENE AND MOLDED OBJECT AND FILM THEREOF

(75) Inventors: Itaru Kuramoto; Yutaka Obata; Tsuyoshi Ota; Toshio Isozaki, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/462,103

(22) PCT Filed: May 21, 1999

(86) PCT No.: PCT/JP99/02688

§ 371 (c)(1), (2), (4) Date: Jan. 13, 2000

(87) PCT Pub. No.: WO99/61493

PCT Pub. Date: Dec. 2, 1999

(30) Foreign Application Priority Data

May 22, 1998 (JP) .......................... 10-141572
May 11, 1999 (JP) .......................... 11-130211

(51) Int. Cl.$^7$ .............................. C08F 110/06
(52) U.S. Cl. .................. 526/351; 526/160; 526/943; 526/348.1
(58) Field of Search ................ 526/351, 160, 526/943, 348.1

(56) References Cited

U.S. PATENT DOCUMENTS 5,932,510 A * 8/1999 Hosaka et al. ............ 502/127

FOREIGN PATENT DOCUMENTS

| JP | 06 145242 | * 5/1994 |
| JP | 02 502734 | * 7/1994 |
| JP | 06 184230 | * 7/1994 |

* cited by examiner

Primary Examiner—David W. Wu
Assistant Examiner—Ling-Siu Choi
(74) Attorney, Agent, or Firm—Oblon, Spivak, McClelland, Maier & Neustadt, P.C.

(57) ABSTRACT

Provided is a crystalline polypropylene of which the 0° C. soluble content, α (% by weight), as measured through programmed-temperature fractionation and the molecular weight, Mp, for the peak in the molecular weight distribution curve as measured through gel permeation chromatography satisfy the relationship of the following formula (1):

$$\alpha \leq -0.42 \times \ln(Mp) + 7.3 \qquad (1),$$

and the melting point, Tm (° C.), as measured through differential scanning calorimetry and Mp satisfy the relationship of the following formula (2):

$$Tm > 1.85 \times \ln(Mp) + 144.5 \qquad (2).$$

Also provided are moldings and films of the crystalline polypropylene. The crystalline polypropylene and its moldings and films are highly rigid and have good heat resistance and good scratch resistance.

16 Claims, No Drawings

CRYSTALLINE POLYPROPYLENE AND MOLDED OBJECT AND FILM THEREOF

TECHNICAL FIELD

The present invention relates to crystalline polypropylene and its moldings and films, precisely to crystalline polypropylene and its moldings and films which are rigid and have good heat resistance and good scratch resistance.

BACKGROUND ART

Polypropylene resins have good heat resistance, good chemical resistance and good electrical properties. In addition, they are rigid and have high tensile strength, good optical properties, and are easy to work. Therefore, they are used, for example, in injection molding, film formation, sheet formation and blow molding. Moreover, as their specific gravity is low, they are widely used in various fields including, for example, containers and wrapping materials. However, for some applications, the properties of the resins are not always satisfactory, and use of the resins is often limited.

Of the properties of polypropylene noted above, its rigidity, heat resistance and scratch resistance are inferior to those of polystyrene and ABS resins. Therefore, for moldings which must be especially rigid and have good heat resistance, polypropylene can not be used. If it is desired that polypropylene moldings have the same high rigidity and good heat resistance as polystyrene or ABS resin moldings, their thickness must be made large. This means that thin polypropylene moldings are difficult to produce and their production costs are high. For these reasons, applications of polypropylene and polypropylene compositions can not be further expanded. If polypropylene could be improved to have satisfactory rigidity, chemical resistance, moldability, heat resistance and hardness, it could be a substituent for polystyrene and ABS resins and its applications could be expanded further. If so, in addition, thin moldings of polypropylene could be produced. Such improved polypropylene, if obtained, would have the advantage of saving natural resources and reducing the costs in producing its moldings.

In addition, when applied to the field of films, for example, for wrapping or packaging eatables or fibers, or for various sundries, etc., the polypropylene films could exhibit good properties of high rigidity and good heat resistance with low molding shrinkage while they are well extensible.

This being the situation, some techniques for increasing the rigidity of crystalline polypropylene are known. For example, one known method is that of adding an organic nucleating agent, such as aluminium para-tert-butylbenzoate, 1,8-2,4-dibenzylidenesorbitol or sodium 2,2-methylenebis(4,6-di-tert-butylphenyl) phosphate, to crystalline polypropylene, and molding the resulting composition. However, the method is expensive and is not economical. In addition, the method has the problem that the organic nucleating agent added to crystalline polypropylene greatly lowers the surface gloss, the impact strength and the tensile elongation of the polypropylene moldings. Another method for enhancing the rigidity of crystalline polypropylene is known, which comprises adding an inorganic filler such as talc, calcium carbonate or kaolin to crystalline polypropylene. In this method, however, the inorganic filler added detracts from the intrinsic characteristics of crystalline polypropylene its light weight and transparency. In addition, the method has the problem that the impact strength, the gloss, the tensile elongation and the workability of the polypropylene moldings produced are poor.

In that situation, the object of the present invention is to provide a novel crystalline polypropylene and its moldings and films having the advantages of high rigidity, good heat resistance and good scratch resistance. Precisely, the invention is to provide a novel crystalline polypropylene and its moldings and films having the advantages of high flexural modulus, high tensile modulus, high heat deformation temperature and high hardness.

DISCLOSURE OF THE INVENTION

We, the present inventors have done assiduous researches to attain the object noted above, and, as a result, have found that the component of polypropylene which does not crystallize but remains dissolving in a solvent in its crystallization step (this component will be isotactic polypropylene or a low-molecular-weight component) lowers the degree of crystallinity of the polymer, acting as a factor of retarding the rigidity, the heat resistance and the scratch resistance of the polymer. We have further found that, when the amount of the soluble component of polypropylene, the melting point of the polymer as measured through differential scanning calorimetry, and the molecular weight for the peak in the molecular weight distribution curve of the polymer as measured through gel permeation chromatography (GPC) satisfy a specific relationship therebetween, then the polymer, polypropylene could have enhanced rigidity, heat resistance and scratch resistance and meets the object of the invention. On the basis of these findings, we have completed the invention.

Specifically, the invention provides a novel crystalline polypropylene and its moldings and films, which are as follows:

1. A crystalline polypropylene of which the 0° C. soluble content, $\alpha$ (% by weight), as measured through programmed-temperature fractionation and the molecular weight, Mp, for the peak in the molecular weight distribution curve as measured through GPC satisfy the relationship given in the following formula (1):

$$\alpha \leq -0.42 \times \ln(Mp) + 7.3 \qquad (1),$$

and the melting point, Tm (° C.), as measured through differential scanning calorimetry and Mp satisfy the relationship given in the following formula (2):

$$Tm > 1.85 \times \ln(Mp) + 144.5 \qquad (2).$$

2. The crystalline polypropylene of above 1, of which the ratio of the weight-average molecular weight Mw to the number-average molecular weight Mn, Mw/Mn, as measured through GPC is at most 6.5.

3. The crystalline polypropylene of above 1 or 2, of which the intrinsic viscosity [η] as measured in a tetralin solvent at 135° C. falls between 0.5 and 4.0 dl/g.

4. The crystalline polypropylene of any one of above 1 to 3, of which the molecular weight, Mp, for the peak in the molecular weight distribution curve as measured through GPC is at least 10,000.

5. A molding of the crystalline polypropylene of any one of above 1 to 4.

6. A film of the crystalline polypropylene of any one of above 1 to 4.

BEST MODES OF CARRYING OUT THE INVENTION

The crystalline polypropylene and its moldings and films of the invention are described hereinunder.

1. Crystalline Polypropylene

Of the crystalline polypropylene of the invention, the 0° C. soluble content, α (% by weight), as measured through programmed-temperature fractionation and the molecular weight, Mp, for the peak in the molecular weight distribution curve as measured through GPC must satisfy the relationship given in the following formula (1):

$$\alpha \leq -0.42 \times \ln(Mp) + 7.3 \quad (1).$$

Preferably, the two satisfy the following formula (3), and more preferably the following formula (4):

$$\alpha \leq -0.42 \times \ln(Mp) + 6.8 \quad (3)$$

$$\alpha \leq -0.42 \times \ln(Mp) + 6.3 \quad (4).$$

If formula (1) is not satisfied, the rigidity of the crystalline polypropylene is low, and is unfavorable.

Of the crystalline polypropylene of the invention, the 0° C. soluble content, α (% by weight) is measured according to the following method. 75 mg of the polymer to be tested is put into 10 ml of o-dichlorobenzene at room temperature, and dissolved therein, stirring at 135 to 150° C. for 1 hour, to prepare a sample solution. 0.5 ml of the sample solution is charged into a column at 135° C., and then gradually cooled to 0° C. at a cooling rate of 10° C./hr, whereby the polymer is crystallized on the surface of the filler in the column. During the process, the amount of the polymer not crystallized but still remaining in solution is measured, and this indicates the 0° C. soluble content of the polymer.

Mp is obtained according to the following method.

This is calculated from the data of gel permeation chromatography (GPC) of the polymer. Precisely, 240 µl of a sample solution having a polymer concentration of 0.1 (weight/volume (%)) in 1,2,4-trichlorobenzene (containing 300 ppm of BHT) is applied to a mixed polystyrene gel column (for example, Tosoh's GMH6HT) at a flow rate of 1.0 ml/min at 145° C. to obtain the molecular weight distribution curve of the polymer. The molecular weight for the peak of the curve is given by Mp. For the detection, used is a differential refraction indicator (RI), for which the wavelength of light is 3.41 µm.

In addition, the melting point, Tm (° C.), as measured through differential scanning calorimetry and Mp of the crystalline polypropylene of the invention must satisfy the relationship given in the following formula (2):

$$Tm > 1.85 \times \ln(Mp) + 144.5 \quad (2).$$

Preferably, the two satisfy the following formula (5):

$$Tm > 1.85 \times \ln(Mp) + 145.0 \quad (5).$$

If formula (2) is not satisfied, the heat resistance of the crystalline polypropylene is low, and is unfavorable.

Tm (° C.) is obtained according to the following method.

Loaded in a differential scanning calorimeter, Model DSC-7 from Perkin-Elmer, a polypropylene sample (10 mg±0.05 mg) is heated from room temperature up to 220° C. at a heating rate of 500° C./min, kept at the temperature for 3 minutes, then cooled down to 50° C. at a cooling rate of −10° C./min, kept at the temperature for 3 minutes, and again heated up to 190° C. at a heating rate of 10° C./min. In the heat cycle giving a curve for the melting profile of the sample, the peak appearing in the curve after 150° C. in the second-stage heating step is read. This indicates the melting point, Tm of the sample.

In addition to the requirement as above, the crystalline polypropylene of the invention is preferably such that the ratio of its weight-average molecular weight Mw to its number-average molecular weight Mn, Mw/Mn, as measured through GPC is at most 6.5. More preferably, the ratio is at most 5.5. If the ratio is larger than 6.5, the elongation and the impact resistance of the polymer will be low.

And further, the crystalline polypropylene of the invention preferably has an intrinsic viscosity [η] falling between 0.5 and 4.0 dl/g, more preferably between 0.5 and 3.0 dl/g, when measured in a tetralin solvent at 135° C. If its intrinsic viscosity [η] is lower than 0.5 dl/g, the crystalline polypropylene will have poor heat resistance. If higher than 4.0 dl/g the rigidity of the crystalline polypropylene will be low.

Still further, Mp of the crystalline polypropylene of the invention is preferably at least 10,000, more preferable at least 30,000, even more preferably at least 50,000. If its Mp is smaller than 10,000, the crystalline polypropylene will have poor heat resistance.

2. Method for Producing Crystalline Polypropylene

The crystalline polypropylene of the invention may be produced by polymerizing propylene in the presence of a catalyst that comprises (A) a solid catalyst component prepared by contacting a magnesium compound and a titanium compound with each other in the presence of an electron donor compound and, if necessary, a silicon compound, at a temperature falling between 120° C. and 150° C., followed by washing the resulting product with an inert solvent at a temperature falling between 100° C. and 150° C., (B) an organic aluminium compound, and, if necessary, a third component (C) consisting of an electron donor compound.

Catalyst components, a method for preparing the catalyst, and a method of polymerizing propylene are described below.

[I] Catalyst Components (A) Solid Catalyst Component

The solid catalyst component comprises magnesium, titanium and an electron donor, and is formed from (a) a magnesium compound, (b) a titanium compound, (c) an electron donor compound, and, if necessary, (d) a silicon compound, which are as follows:

(a) Magnesium Compound

The magnesium compound for use in the invention is not specifically defined. Preferably used herein are magnesium compounds of a general formula (I):

$$MgR^1R^2 \quad (I)$$

In formula (I), $R^1$ and $R^2$ each represent a hydrocarbon residue, a group of $OR^3$ (where $R^3$ represents a hydrocarbon residue), or a halogen atom. More precisely, the hydrocarbon residue includes, for example, $C_{1-12}$ alkyl, cycloalkyl, aryl and aralkyl groups. In the group $OR^3$, $R^3$ includes, for example, $C_{1-12}$ alkyl, cycloalkyl, aryl and aralkyl groups. The halogen atom includes, for example, chlorine, bromine, iodine and fluorine atoms. $R^1$ and $R^2$ may be the same or different ones.

Specific examples of the magnesium compounds of formula (I) include alkylmagnesiums and arylmagnesiums such as dimethylmagnesium, diethylmagnesium, diisopropylmagnesium, dibutylmagnesium, dihexylmagnesium, dioctylmagnesium, ethylbutylmagnesium, diphenylmagnesium, dicyclohexylmagnesium, etc.; alkoxymagnesiums and aryloxymagnesiums such as dimethoxymagnesium, diethoxymagnesium, dipropoxymagnesium, dibutoxymagnesium, dihexyloxymagnesium, dioctoxymagnesium, diphenoxymagnesium, dicyclohexyloxymagnesium, etc.; alkylmagnesium halides and arylmagnesium halides such as ethylmagnesium chloride, butylmagnesium chloride, hexylmagnesium chloride, isopropylmagnesium chloride, isobutylmagnesium chloride, t-butylmagnesium chloride, phenylmagnesium bromide, benzylmagnesium chloride, ethylmagnesium bromide, butylmagnesium bromide, phenylmagnesium chloride, butylmagnesium iodide, etc.; alkoxymagnesium halides and aryloxymagnesium halides such as butoxymagnesium chloride, cyclohexyloxymagnesium chloride, phenoxymagnesium chloride, ethoxymagnesium bromide, butoxymagnesium bromide, ethoxymagnesium iodide, etc.; magnesium halides such as magnesium chloride, magnesiumbromide, magnesium iodide, etc.

Of these magnesium compounds, preferred are magnesium halides, alkoxymagnesiums, alkylmagnesiums and alkylmagnesium halides, in view of their polymerization capability and stereospecificity.

The magnesium compounds noted above may be prepared from metal magnesium or magnesium-containing compounds.

One example of producing the magnesium compounds comprises contacting a metal magnesium with a halogen and an alcohol.

The halogen includes iodine, chlorine, bromine and fluorine. Of those, preferred is iodine. The alcohol includes, for example, methanol, ethanol, propanol, butanol, cyclohexanol, octanol, etc.

Another example of producing the magnesium compounds comprises contacting a magnesiumalkoxy compound of $Mg(OR^4)_2$ (where $R^4$ represents a hydrocarbon residue having from 1 to 20 carbon atoms) with a halide.

The halide includes, for example, silicon tetrachloride, silicon tetrabromide, tin tetrachloride, tin tetrabromide, hydrogen chloride, etc. Of those, preferred is silicon tetrachloride, in view of its polymerization capability and stereospecificity. $R^4$ includes, for example, an alkyl group such as methyl, ethyl, propyl, isopropyl, butyl, isobutyl, hexyl and octyl groups, etc.; a cyclohexyl group; an alkenyl group such as allyl, propenyl and butenyl groups, etc.; an aryl group such as phenyl, tolyl and xylyl groups, etc.; an aralkyl group such as phenethyl and 3-phenylpropyl groups, etc. Of those, especially preferred is an alkyl group having from 1 to 10 carbon atoms.

The magnesium compounds may be supported by a carrier; for example, silica, alumina, or polystyrene.

The magnesium compounds may be used either singly or as combined. If desired, they may contain other elements such as halogens, e.g., iodine, as well as silicon, aluminium, etc., and may further contain electron donors such as alcohols, ethers, esters, etc.

(b) Titanium Compound

The titanium compound for use in the invention is not specifically defined. Preferably used herein are titanium compounds of a general formula (II):

$$TiX^1{}_p(OR^5)_{4-p} \qquad (II)$$

In formula (II), $X^1$ represents a halogen atom, and is preferably a chlorine atom or a bromine atom, more preferably a chlorine atom. $R^5$ represents a hydrocarbon residue, which may be saturated or unsaturated, and may be linear, branched or cyclic. It may have hetero atoms such as sulfur, nitrogen, oxygen, silicon, phosphorus and the like. Preferably, however, $R^5$ is a hydrocarbon residue having from 1 to 10 carbon atoms, more preferably an alkyl, alkenyl, cycloalkenyl, aryl or aralkyl group, even more preferably a linear or branched alkyl group. A plurality of $(OR^5)$'s, if any, may be the same or different ones. Specific examples of $R^5$ include a methyl group, an ethyl group, an n-propyl group, an isopropyl group, an n-butyl group, a sec-butyl group, an isobutyl group, an n-pentyl group, an n-hexyl group, an n-heptyl group, an n-octyl group, an n-decyl group, an allyl group, a butenyl group, a cyclopentyl group, a cyclohexyl group, a cyclohexenyl group, a phenyl group, a tolyl group, a benzyl group, a phenethyl group, etc. p represents an integer of from 0 to 4.

Specific examples of the titanium compounds of formula (II) include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium, etc.; titanium tetrahalides such as titanium tetrachloride, titanium tetrabromide, titanium tetraiodide, etc.; alkoxytitanium trihalides such as methoxytitanium trichloride, ethoxytitanium trichloride, propoxytitanium trichloride, n-butoxytitanium trichloride, ethoxytitanium tribromide, etc.; dialkoxytitanium dihalides such as dimethoxytitanium dichloride, diethoxytitanium dichloride, diisopropoxytitanium dichloride, di-n-propoxytitanium dichloride, diethoxytitanium dibromide, etc.; trialkoxytitanium monohalides such as trimethoxytitanium chloride, triethoxytitanium chloride, triisopropoxytitanium chloride, tri-n-propoxytitanium chloride, tri-n-butoxytitanium chloride, etc. Of those, preferred are high-halogen titanium compounds in view of their polymerization capability. Especially preferred is titanium tetrachloride. These titanium compounds may be used either singly or as combined.

(c) Electron donor compound

The electron donor compound for use in the invention includes oxygen-containing electron donors, such as alcohols, phenols, ketones, aldehydes, esters of organic or inorganic acids, ethers, e.g., monoethers, diethers, polyethers, etc.; and nitrogen-containing electron donors such as ammonia, amines, nitriles, isocyanates, etc. Among the organic acids, used are carboxylic acids, typically malonic acid.

Of these, preferred are esters of polycarboxylic acids, and more preferred are esters of aromatic polycarboxylic acids. In view of their polymerization capability, especially preferred are monoesters and/or diesters of aromatic dicarboxylic acids. Even more preferably, the organic group in the ester segments of those esters should be a linear, branched or cyclic aliphatic hydrocarbon residue.

Concretely mentioned are dialkyl esters of dicarboxylic acids of, for example, phthalic acid, naphthalene-1,2-dicarboxylic acid, naphthalene-2,3-dicarboxylic acid, 5,6,7,8-tetrahydronaphthalene-1,2-dicarboxylic acid, 5,6,7,8-tetrahydronaphthalene-2,3-dicarboxylic acid, indane-4,5-dicarboxylic acid and indane-5,6-dicarboxylic acid, in which the alkyl groups are any of methyl, ethyl, n-propyl, isopropyl, n-butyl, isobutyl, t-butyl, n-pentyl, 1-methylbutyl, 2-methylbutyl, 3-methylbutyl, 1,1-dimethylpropyl, 1-methylpentyl, 2-methylpentyl, 3-methypentyl, 4-methylpentyl, 1-ethylbutyl, 2-ethylbutyl, n-hexyl, cyclohexyl, n-heptyl, n-octyl, n-nonyl, 2-methylhexyl, 3-methylhexyl, 4-methylhexyl, 2-ethylhexyl, 3-ethylhexyl, 4-ethylhexyl, 2-methylpentyl, 3-methylpentyl, 2-ethylpentyl and 3-ethylpentyl groups. Of these, preferred are diphthalates. Even more preferably, the organic group in the ester segments of those esters should be a linear or branched aliphatic hydrocarbon residue having at least 4 carbon atoms.

As specific examples of the preferred diphthalates, mentioned are di-n-butyl phthalate, diisobutyl phthalate, di-n- heptyl phthalate, and diethyl phthalate. These compounds may be used either singly or as combined.

(d) Silicon Compound

In preparing the solid catalyst component, an additional ingredient (d) consisting of a silicon compound of the following general formula (III) is used where necessary, in addition to the ingredients (a), (b) and (c) noted above.

wherein $R^6$ represents a hydrocarbon residue; $X^2$ represents a halogen atom; and q represents an integer of from 0 to 3.

Using the silicon compound in preparing the solid catalyst component is preferred, as it often enhances the function and the stereospecificity of the catalyst and reduces the fine powder content found within the polymer produced.

In formula (III), $X^2$ represents a halogen atom, and is preferably a chlorine or bromine atom, more preferably a chlorine atom. $R^6$ represents a hydrocarbon residue, which may be saturated or unsaturated, and may be linear, branched or cyclic. This may have hetero atoms such as sulfur, nitrogen, oxygen, silicon, phosphorus and the like. Preferably, however, $R^6$ is a hydrocarbon residue having from 1 to 10 carbon atoms, more preferably an alkyl, alkenyl, cycloalkenyl, aryl or aralkyl group. A plurality of (—$OR^6$)'s, if any, may be the same or different ones. Specific examples of $R^6$ include a methyl group, an ethyl group, an n-propyl group, an isopropyl group, an n-butyl group, a sec-butyl group, an isobutyl group, an n-pentyl group, an n-hexyl group, an n-heptyl group, an n-octyl group, an n-decyl group, an allyl group, a butenyl group, a cyclopentyl group, a cyclohexyl group, a cyclohexenyl group, a phenyl group, a tolyl group, a benzyl group, a phenethyl group, etc. q represents an integer of from 0 to 3.

Specific examples of the silicon compounds of formula (III) include silicon tetrachloride, methoxytrichlorosilane, dimethoxydichlorosilane, trimethoxychlorosilane, ethoxytrichlorosilane, diethoxydichlorosilane, triethoxychlorosilane, propoxytrichlorosilane, dipropoxydichlorosilane, tripropoxychlorosilane, etc. Of those, especially preferred is silicon tetrachloride. These silicon compounds may be used either singly or as combined.

(B) Organic Aluminium Compound

The organic aluminium compound (B) for use in producing the crystalline polypropylene of the invention is not specifically defined. Preferably used are organic aluminium compounds having any of alkyl groups, halogen atoms, hydrogen atoms and alkoxy groups, as well as aluminoxanes and their mixtures. Concretely mentioned are trialkylaluminiums such as trimethylaluminium, triethylaluminium, triisopropylaluminium, triisobutylaluminium, trioctylaluminium, etc.; dialkylaluminium monochlorides such as diethylaluminium monochloride, diisopropylaluminium monochloride, diisobutylaluminium monochloride, dioctylaluminium monochloride, etc.; alkylaluminium sesqui-halides such as ethylaluminium sesqui-chloride, etc.; linear aluminoxanes such as methylaluminoxane, etc. Of those organic aluminium compounds, preferred are trialkylaluminiums having $C_{1-5}$ lower alkyl groups, and especially preferred are trimethylaluminium, triethylaluminium, triisopropylaluminium and triisobutylaluminium. The organic aluminium compounds may be used either singly or as combined.

(C) Third Component (Electron Donor Compound)

In preparing the polymerization catalyst to be used herein for producing the crystalline polypropylene of the invention, used when necessary is (C) an electron donor compound.

The electron donor compound (C) includes organic silicon compounds with Si-O-C bonds, nitrogen-containing compounds, phosphorus-containing compounds, and oxygen-containing compounds. Of those, especially preferred are organic silicon compounds with Si—O—C bonds, and also ethers and esters, in view of their polymerization capability and stereospecificity. More preferred are organic silicon compounds with Si—O—C bonds.

Specific examples of the organic silicon compounds with Si—O—C bonds include tetramethoxysilane, tetraethoxysilane, tetrabutoxysilane, tetraisobutoxysilane, trimethylmethoxysilane, trimethylethoxysilane, triethylmethoxysilane, triethylethoxysilane, ethylisopropyldimethoxysilane, propylisopropyldimethoxysilane, diisopropyldimethoxysilane, diisobutyldimethoxysilane, isopropylisobutyldimethoxysilane, di-t-butyldimethoxysilane, t-butylmethyldimethoxysilane, t-butylethyldimethoxysilane, t-butylpropyldimethoxysilane, t-butylisopropyldimethoxysilane, t-butylbutyldimethoxysilane, t-butylisobutyldimethoxysilane, t-butyl(s-butyl) dimethoxysilane, t-butylamyldimethoxysilane, t-butylhexyldimethoxysilane, t-butylheptyldimethoxysilane, t-butyloctyldimethoxysilane, t-butylnonyldimethoxysilane, t-butyldecyldimethoxysilane, t-butyl(3,3,3-trifluoromethylpropyl)dimethoxysilane, cyclohexylmethyldimethoxysilane, cyclohexylethyldimethoxysilane, cyclohexylpropyldimethoxysilane, cyclopentyl-t-butyldimethoxysilane, cyclohexyl-t-butyldimethoxysilane, dicyclopentyldimethoxysilane, dicyclohexyldimethoxysilane, bis(2-methylcyclopentyl) dimethoxysilane, bis(2,3-dimethylcyclopentyl) dimethoxysilane, diphenyldimethoxysilane, phenyltriethoxysilane, methyltrimethoxysilane, ethyltrimethoxysilane, propyltrimethoxysilane, isopropyltrimethoxysilane, butyltrimethoxysilane, isobutyltrimethoxysilane, t-butyltrimethoxysilane, s-butyltrimethoxysilane, amyltrimethoxysilane, isoamyltrimethoxysilane, cyclopentyltrimethoxysilane, cyclohexyltrimethoxysilane, norbornyltrimethoxysilane, indenyltrimethoxysilane, 2-methylcyclopentyltrimethoxysilane, cyclopentyl(t-butoxy) dimethoxysilane, isopropyl (t-butoxy) dimethoxysilane, t-butyl(isobutoxy)dimethoxysilane, t-butyl(t-butoxy)dimethoxysilane, thexyltrimethoxysilane, thexylisopropoxydimethoxysilane, thexyl(t-butoxy) dimethoxysilane, thexylmethyldimethoxysilane, thexylethyldimethoxysilane, thexylisopropyldimethoxysilane, thexylcyclopentyldimethoxysilane, thexylmyristyldimethoxysilane, thexylcyclohexyldimethoxysilane, etc.

Also usable herein are silicon compounds of a general formula (IV):

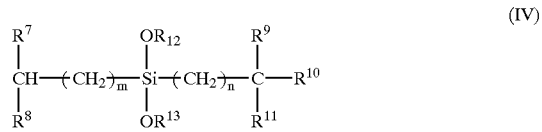

wherein $R^7$ to $R^9$ each represent a hydrogen atom or a hydrocarbon residue, and they may be the same or different, and may be bonded to the adjacent group to form a ring; $R^{10}$ and $R^{11}$ each represent a hydrocarbon residue, and they may be the same or different, and may be bonded to the adjacent group to form a ring; $R^{12}$ and $R^{13}$ each represent an alkyl group having from 1 to 20 carbon atoms, and they may be the same or different; m represents an integer of at least 2; and n represents an integer of at least 2.

In formula (IV), concretely, $R^7$ to $R^9$ each may be a hydrogen atom; a linear hydrocarbon residue such as a methyl group, an ethyl group, an n-propyl group, etc.; a branched hydrocarbon residue such as an isopropyl group, an isobutyl group, a t-butyl group, a thexyl group, etc.; a saturated cyclic hydrocarbon residue such as a cyclobutyl group, a cyclopentyl group, a cyclohexyl group, etc.; or an unsaturated cyclic hydrocarbon residue such as a phenyl group, a pentamethylphenyl group, etc. Of those, preferred are a hydrogen atom and C1–6 linear hydrocarbon residues; and more preferred are a hydrogen atom, a methyl group, and an ethyl group.

In formula (IV), $R^{10}$ and $R^{11}$ each may be a linear hydrocarbon residue such as a methyl group, an ethyl group, an n-propyl group, etc.; a branched hydrocarbon residue such as an isopropyl group, an isobutyl group, a t-butyl group, a thexyl group, etc.; a saturated cyclic hydrocarbon residue such as a cyclobutyl group, a cyclopentyl group, a cyclohexyl group, etc.; or an unsaturated cyclic hydrocarbon residue such as a phenyl group, a pentamethylphenyl group, etc. These $R^{10}$ and $R^{11}$ may be the same or different. Of the groups concretely mentioned, preferred are C1–6 linear hydrocarbon residues; and more preferred are a methyl group and an ethyl group.

In formula (IV), $R^{12}$ and $R^{13}$ each maybe a linear or branched alkyl group, such as a methyl group, an ethyl group, an n-propyl group, an isopropyl group, an n-butyl group, an isobutyl group, a sec-butyl group, a t-butyl group, an n-pentyl group, an n-hexyl group, an n-octyl group, etc. These $R^{12}$ and $R^{13}$ may be the same or different. Of the groups concretely mentioned, preferred are C1–6 linear hydrocarbon residues; and more preferred is a methyl group.

Preferred examples of the silicon compounds of formula (IV) are neopentyl-n-propyldimethoxysilane, neopentyl-n-butyldimethoxysilane, neopentyl-n-pentyldimethoxysilane, neopentyl-n-hexyldimethoxysilane, neopentyl-n-heptyldimethoxysilane, isobutyl-n-propyldimethoxysilane, isobutyl-n-butyldimethoxysilane, isobutyl-n-pentyldimethoxysilane, isobutyl-n-hexyldimethoxysilane, isobutyl-n-heptyldimethoxysilane, 2-cyclohexylpropyl-n-propyldimethoxysilane, 2-cyclohexylbutyl-n-propyldimethoxysilane, 2-cyclohexylpentyl-n-propyldimethoxysilane, 2-cyclohexylhexyl-n-propyldimethoxysilane, 2-cyclohexylheptyl-n-propyldimethoxysilane, 2-cyclopentylpropyl-n-propyldimethoxysilane, 2-cyclopentylbutyl-n-propyldimethoxysilane, 2-cyclopentylpentyl-n-propyldimethoxysilane, 2-cyclopentylhexyl-n-propyldimethoxysilane, 2-cyclopentylheptyl-n-propyldimethoxysilane, isopentyl-n-propyldimethoxysilane, isopentyl-n-butyldimethoxysilane, isopentyl-n-pentyldimethoxysilane, isopentyl-n-hexyldimethoxysilane, isopentyl-n-heptyldimethoxysilane, isopentylisobutyldimethoxysilane, isopentylneopentyldimethoxysilane, diisopentyldimethoxysilane, diisoheptyldimethoxysilane, diisohexyldimethoxysilane, etc. Of those, more preferred are neopentyl-n-propyldimethoxysilane, neopentyl-n-pentyldimethoxysilane, isopentylneopentyldimethoxysilane, diisopentyldimethoxysilane, diisoheptyldimethoxysilane, diisohexyldimethoxysilane; and even more preferred are neopentyl-n-pentyldimethoxysilane, and diisopentyldimethoxysilane.

The silicon compounds of formula (IV) may be produced by any method the producer prefers. Typical processes for producing them are mentioned below.

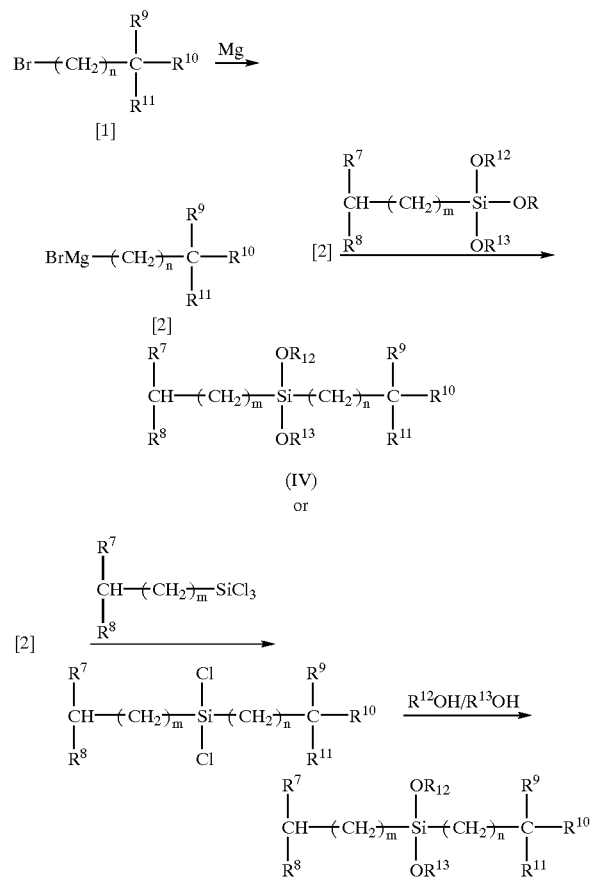

In these processes, the starting compounds [1] are on the market, or may be prepared through known alkylation or halogenation. The compounds [1] are subjected to the publicly known Grignard reaction to obtain the organic silicon compounds of formula (IV).

The organic silicon compounds mentioned above maybe used either singly or as combined.

Specific examples of the nitrogen-containing compounds include 2,6-substituted piperidines such as 2,6-diisopropylpiperidine, 2,6-diisopropyl-4-methylpiperidine, N-methyl-2,2,6,6-tetramethylpiperidine, etc.; 2,5-substituted azolidines such as 2,5-diisopropylazolidine, N-methyl-2,2,5,5-tetramethylazolidine, etc.; substituted methylenediamines such as N,N,N',N'-tetramethylmethylenediamine, N,N,N',N'-tetraethylmethylenediamine, etc.; substituted imidazolidines such as 1,3-dibenzylimidazolidine, 1,3-dibenzyl-2-phenylimidazolidine, etc.

Specific examples of the phosphorus-containing compounds include phosphites such as triethyl phosphite, tri-n-propyl phosphite, triisopropyl phosphate, tri-n-butyl phosphite, triisobutyl phosphite, diethyl-n-butyl phosphite, diethylphenyl phosphite, etc.

Specific examples of the oxygen-containing compounds include 2,6-substituted tetrahydrofurans such as 2,2,6,6-tetramethyltetrahydrofuran, 2,2,6,6-tetraethyltetrahydrofuran, etc.; dimethoxymethane derivatives such as 1,1-dimethoxy-2,3,4,5-tetrachlorocyclopentadiene, 9,9-dimethoxyfluorene, diphenyldimethoxymethane, etc.

[II] Preparation of Solid Catalyst Component

The solid catalyst component (A) noted above may be prepared by bringing the magnesium compound (a), the titanium compound (b), the electron donor (c) and, if necessary, the silicon compound (d) into contact with each other in any known method, except for the temperature at which they are contacted with each other. The order they are brought into contact is not specifically defined. For example, the components may be brought into contact with each other in an inert solvent such as a hydrocarbon solvent, or they may be first diluted with an inert solvent such as a hydrocarbon solvent and then contacted with each other. The inert solvent includes, for example, aliphatic hydrocarbons and alicyclic hydrocarbons such as octane, decane, ethylcyclohexane, etc., and also their mixtures.

The amount of the titanium compound to be used may be generally from 0.5 to 100 mols, preferably from 1 to 50 mols, relative to 1 mol of magnesium of the magnesium compound. If the molar ratio of the two oversteps the defined range, the catalyst function will be poor. The amount of the electron donor to be used may be generally from 0.01 to 10 mols, preferably from 0.05 to 1.0 mol, relative to 1 mol of magnesium of the magnesium compound. If the molar ratio of the two oversteps the defined range, the catalyst function and stereospecificity will be poor. The amount of the silicon compound, if used, may be generally from 0.001 to 100 mols, preferably from 0.005 to 5.0 mols, relative to 1 mol of magnesium of the magnesium compound. If the molar ratio of the two oversteps the defined range, the silicon compound used will not satisfactorily realize its potentiality to improve the catalyst activity and stereospecificity. If so, in addition, the amount of fine powder contained within the polymer produced will increase.

To bring about contact between the components (a) to (d), they are all mixed and heated at a temperature falling between 120 and 150° C., preferably between 125 and 140° C. If the temperature of contact oversteps the defined range, the catalyst function and stereospecificity will be poor. Under the conditions, they are brought into contact with each other generally for a period of from 1 minute to 24 hours, preferably from 10 minutes to 6 hours. The pressure applied during contact may vary, depending on the type of the solvent, if used, and on the contact temperature, but generally falls between 0 and 50 kg/cm$^2$G, preferably between 0 and 10 kg/cm$^2$G. During the operation for bringing them into contact with each other, it is desirable to stir the system so as to ensure uniform contact and enhance the efficiency of contact.

Also desirably, the titanium compound is contacted at least twice with the magnesium compound that serves as a catalyst carrier, to allow the magnesium compound to satisfactorily carry out its purpose.

Where a solvent is used in the contact operation, its amount may be generally at most 5000 ml, but preferably from 10 to 1000 ml, relative to one mol of the titanium compound. If the ratio oversteps the defined range, uniform contact can not be attained and the contact efficiency will be low.

The solid catalyst component produced as a result of the contact operation noted above is washed with an inert solvent at a temperature falling between 100 and 150° C., preferably between 120 and 140° C. If the washing temperature oversteps the defined range, the catalyst function and stereospecificity cannot be sufficient. The inert solvent can be, for example, aliphatic hydrocarbons such as octane, decane, etc.; alicyclic hydrocarbons such as methylcyclohexane, ethylcyclohexane, etc.; aromatic hydrocarbons such as toluene, xylene, etc.; halogenohydrocarbons such as tetrachloroethane, chlorofluorohydrocarbons, etc.; and their mixtures. Of those, preferred are aliphatic hydrocarbons.

The washing method is not specifically defined; however, preferred is decantation or filtration. The amount of the inert solvent to be used, the washing time, and how many times the washing operation is repeated are not also specifically defined. In general, for example, the amount of the solvent to be used may fall between 100 and 100000 ml, preferably between 1000 and 50000 ml, relative to 1 mol of the magnesium compound, and the washing time may fall between 1 minute and 24 hours, preferably between 10 minutes and 6 hours. If the ratio oversteps the defined range, the product cannot be washed satisfactorily.

The pressure for the washing operation varies, depending on the type of the solvent used and the washing temperature, but may fall generally between 0 and 50 kg/cm$^2$G, preferably between 0 and 10 kg/cm$^2$G. During the washing operation, it is desirable to stir the system so as to ensure uniform washing and enhance the washing efficiency. The resulting solid catalyst component may be stored in dry, or in an inert solvent such as a hydrocarbon solvent.

[III] Polymerization

The amount of the catalyst to be used in producing the crystalline polypropylene of the invention is not specifically defined. For example, the solid catalyst component (A) may be used in an amount of generally from 0.00005 to 1 mmol, in terms of the titanium atom content thereof, relative to one liter of the reaction system. Regarding the amount of the component (B), organic aluminium compound to be used, the atomic ratio of aluminium/titanium may fall generally between 1 and 1000, but preferably between 10 and 500. If the atomic ratio oversteps the defined range, the catalyst function will be poor. Regarding the amount of the third component (C), electron donor compound such as an organic silicon compound, if used, the molar ratio of electron donor compound (C) /organic aluminium compound (B) may fall generally between 0.001 and 5.0, but preferably between 0.01 and 2.0, more preferably between 0.05 and 1.0. If the molar ratio oversteps the defined range, the catalyst will not exhibit satisfactory activity and stereospecificity. However, if the catalyst is subjected to prepolymerization and the thus pre-treated catalyst is used, the amount of the third component (C) may be reduced to be smaller than the defined range.

In the invention, if desired, before the polymerization in the presence of the catalyst to produce the intended crystalline polypropylene, olefin prepolymerization in the presence of the same may be performed. This is for realizing high catalytic function and high stereospecificity of the catalyst and for improving the powdery morphology of the polymer produced. In that case, an olefin is first prepolymerized in the presence of the catalyst as prepared by mixing the solid catalyst component (A), the organic aluminium compound (B) and, if necessary, the electron donor compound (C) in a predetermined ratio, generally at a temperature falling between 1 and 100° C. under a pressure falling between normal pressure and 50 kg/cm$^2$G or so, and thereafter propylene is polymerized in the presence of the catalyst and the prepolymer having been formed in the previous prepolymerization step.

For the prepolymerization, preferably used are α-olefins of a general formula (V):

$$R^{14}-CH=CH_2 \tag{V}$$

In formula (V), $R^{14}$ represents a hydrogen atom or a hydrocarbon residue. The hydrocarbon residue may be saturated or unsaturated. The olefins concretely include ethylene, propylene, 1-butene, 1-pentene, 1-hexene, 1-heptene, 1-octene, 1-decene, 3-methyl-1-pentene, 4-methyl-l-pentene, vinylcyclohexane, butadiene, isoprene, piperylene, etc. These olefins may be used either singly or as combined. Of the olefins noted above, especially preferred are ethylene and propylene.

The mode of polymerization to produce the crystalline polypropylene of the invention is not specifically defined, and may be among of the following: solution polymerization, slurry polymerization, vapor-phase polymerization, and bulk polymerization. Any of batch polymerization and continuous polymerization may apply to the polymerization mode, and two-stage or multi-stage polymerization under different conditions also may apply thereto.

Regarding the reaction conditions, the polymerization pressure is not specifically defined and may fall generally between atmospheric pressure and 80 kg/cm$^2$G, but preferably between 2 and 50 kg/cm$^2$G; and the polymerization temperature may fall generally between 0 and 200° C., but preferably between 20 and 90° C., more preferably between 40 and 90° C., in view of the polymerization efficiency. The polymerization time varies, depending on the temperature at which the starting propylene is polymerized, and therefore cannot be unconditionally defined. In general, however, the polymerization time may fall between 5 minutes and 20 hours, preferably between 10 minutes and 10 hours or so.

The molecular weight of the polymers to be produced in that manner maybe controlled by adding a chain transfer agent, preferably hydrogen to the reaction system. If desired, the polymerization may be effected in the presence of an inert gas such as nitrogen or the like.

If desired, the starting propylene may be polymerized in two or more stages under different polymerization conditions.

Regarding the catalyst components for use in the invention, the components (A), (B) and (C) may be previously mixed in a predetermined ratio and brought into contact with each other, and, immediately after the preparation of the catalyst in that manner, propylene may be polymerized in the presence of the catalyst; or after the catalyst thus prepared has been aged for 0.2 to 3 hours or so, propylene may be polymerized in the presence of it. The catalyst components may be used after having been suspended in an inert solvent or propylene.

In the invention, the post-treatment after polymerization may be effected in any ordinary manner. For example, the powdery polymer as produced in vapor-phase polymerization is taken out of the polymerization reactor, and a nitrogen stream may be introduced thereinto so as to remove the non-reacted olefin from the polymer. If desired, the polymer may be pelletized through an extruder. In this case, a small amount of water, alcohol or the like may be added to the polymer so as to completely render the catalyst inactive. The polymer as produced in bulk polymerization is taken out of the polymerization reactor, the non-reacted monomer is completely removed from it, and the resulting polymer may be pelletized.

3. Moldings

The moldings of the invention are formed from the crystalline polypropylene. They include, for example, interior finishings for cars, housings for electric and electronic appliances for household use, films for wrapping or packaging eatables, sheets, etc. To produce the moldings, the crystalline polypropylene may be molded, for example, through injection molding, compression molding, injection compression molding, gas-assisted injection molding, extrusion molding, blow molding or the like.

To form the moldings of the invention from the crystalline polypropylene, if desired, surface-modifying additives such as antistatic agents, defogging agents, etc.; as well as other various known additives such as antiblocking agents, antioxidants, weather-proofing agents, heat stabilizers, neutralizing agents, lubricants, nucleating agents, colorants, organic or inorganic fillers and others may be added to the crystalline polypropylene, and the resulting polymer composition may be molded.

4. Films

The films of the invention may be formed from the crystalline polypropylene. The method for forming the films is not specifically defined, and includes, for example, ordinary compression sheeting, extrusion sheeting, blow sheeting, etc. The films of the invention may be or may not be oriented. If biaxially oriented, the films may be formed under the following sheeting conditions.

<1> Condition for sheeting:

Polymer temperature: 200 to 300° C.

Chill roll temperature: not higher than 50° C.

<2> Condition for orientation in machine direction:

Draw ratio: 3 to 7 times the original length.

Temperature: 130 to 160° C.

<3> Condition for orientation in transverse direction:

Draw ratio: 6 to 12 times the original width.

Temperature: 150 to 175° C.

If desired, the films may be subjected to surface treatment, thereby having increased surface energy or having polar surfaces. For example, the surface treatment includes corona discharging, chromate treatment, exposure to flame, exposure to hot air, exposure to ozone or UV rays, and also surface roughening through sand blasting or in solvents, etc.

To form the films of the invention from the crystalline polypropylene, also if desired, surface-modifying additives such as antistatic agents, defogging agents, etc.; as well as other various known additives such as antiblocking agents, antioxidants, weather-proofing agents, heat stabilizers, neutralizing agents, lubricants, nucleating agents, colorants, organic or inorganic fillers and others may be added to the crystalline polypropylene, and the resulting polymer composition may be sheeted.

EXAMPLES

The invention is described in more detail with reference to the following Examples.

Example 1

(Preparation of Solid Catalyst Component)

A 5-liter three-neck flask equipped with a stirrer was purged with nitrogen gas, and 160 g of diethoxymagnesium and then 600 ml of dewatered octane were put thereinto in that order. After the mixture was heated at 40° C., 24 ml of silicon tetrachloride was added thereto and stirred for 20 minutes. Then, 16 ml of dibutyl phthalate was added thereto. The resulting solution was further heated up to 80° C., and 770 ml of titanium tetrachloride was dropwise added thereto through a dropping funnel. The inner temperature was kept at 125° C., and the compounds were catalytically reacted for 2 hours. The resulting product was fully washed with dewatered octane at 125° C. 1220 ml of titanium tetrachloride was added thereto, and the inner temperature was kept at 125° C. Under the condition, the compounds were catalytically reacted for further 2 hours. After this, the product was fully washed with dewatered octane at 125° C. Thus was prepared a solid component (Prepolymerization)

A 1-liter three-neck flask equipped with a stirrer was purged with nitrogen gas, and 48 g of the solid component [A] and then 400 ml of dewatered heptane were put thereinto in that order. This was heated at 40° C., and 2.0 ml of triethylaluminium and 6.3 ml of diisopentyldimethoxysilane were added thereto. Propylene was introduced into the flask under normal pressure and reacted for 2 hours. After this, the solid component was fully washed with dewatered heptane. Thus was prepared a catalyst component to be used herein.

(Polymerization)

A 10-liter stainless autoclave equipped with a stirrer was fully dried and purged with nitrogen, and 6 liters of dewatered heptane was put thereinto. While stirring, this was heated up to 80° C. To the thus-heated heptane, added were 40.0 mmols of triethylaluminium, then 5.0 mmols of dicyclopentyldimethoxysilane, and 0.1 mmols, in terms of Ti, of the solid catalyst component prepared previously, in that order. Then, hydrogen was introduced thereinto to have a hydrogen pressure of 2.5 kg/cm$^2$G, and then propylene was introduced thereinto until there was a total pressure of 8.0 kg/cm$^2$G. After the total pressure reached 8.0 kg/cm$^2$G, the monomer was polymerized for 1 hour. Next, the reaction system was cooled and degassed, and the reaction product was taken out of the autoclave. The solvent was removed from the reaction product by the use of an evaporator, and the resulting product was dried in vacuum to obtain polypropylene.

(Preparation of Samples for Identifying the Structural Characteristics and the Mechanical Properties of the Polymer)

To the polypropylene powder obtained herein, added were 1500 ppm of calcium stearate (from Nippon Oils and Fats) and 500 ppm of DHT-4A (from Kyowa Chemical) both serving as a neutralizing agent, 750 ppm of P-EPQ (from Clarient) and 1500 ppm of Irganox 1010 (from Ciba Speciality Chemicals) both serving as an antioxidant, and 2000 ppm of PTBBA-Al (from Dai-Nippon Ink Chemical) serving as a nucleating agent, and they were well mixed. The resulting mixture was melted, kneaded and pelletized into pellets, through a 20 mm single-screw melt extruder. A part of the pellets were subjected to a predetermined test for identifying the structural characteristics of the polymer. The remaining pellets were formed into test pieces through pressing or injection molding, and the test pieces were tested for their mechanical properties.

(Test Pieces for Mechanical Properties)

(1) Test Pieces for Tensile Modulus, Formed Through Pressing

The polymer pellets were melt-pressed into a plate having a thickness of 1 mm, and test pieces were blanked out of the plate. For the melt-pressing, the polymer pellets were melted at 220° C. for 3 minutes, then pressed under a pressure of 50 Kgf/cm$^2$ for 2 minutes, cooled to 30° C., and again pressed under a pressure of 50 Kgf/cm$^2$ for 5 minutes or more.

(2) Test Pieces Formed Through Injection Molding

Using an injection molding machine, IS100FIII Model (from Toshiba Machine), the polymer pellets were molded into test pieces, for which the temperature of the polymer pellets being molded was 200° C. and the temperature of the mold was 45° C.

(Identification of the Structural Characteristics and the Mechanical Properties of the Polymer)

(1) Intrinsic Viscosity [η]

The polymer was dissolved in tetralin, and its viscosity was measured at 135° C.

(2) 0° C. Soluble Content and Peak Temperature in Elution Curve in Programmed-temperature Fractionation The polymer polypropylene produced through polymerization was subjected to programmed-temperature fractionation to identify its structural characteristics. The sample was prepared as follows: 75 mg of the polymer to be tested was put into 10 ml of o-dichlorobenzene at room temperature, and dissolved therein, stirring at 135 to 150° C. for 1 hour, to prepare a sample solution. 0.5 ml of the sample solution was charged into a column at 135° C., and then gradually cooled to 0° C. at a cooling rate of 10° C./hr, whereby the polymer was crystallized on the surface of the filler existing in the column. During the process, the amount of the polymer not crystallized but still remaining in solution was measured, this indicating the 0° C. soluble content of the polymer.

(3) Molecular Weight Mp for the Peak in the Molecular Weight Distribution Curve, Weight-average Molecular Weight Mw and Number-average Molecular Weight Mn of the Polymer Measured Through GPC Mp, Mw and Mn of the polymer were calculated from the data of gel permeation chromatography (GPC) of the polymer. Precisely, 240 μl of a sample solution having a polymer concentration of 0.1 (weight/volume (%)) in 1,2,4-trichlorobenzene (containing 300 ppm of BHT) was applied to a mixed polystyrene gel column (for example, Tosoh's GMH6HT) at a flow rate of 1.0 ml/min at 145° C. to obtain the molecular weight distribution curve of the polymer. The molecular weight Mp for the peak of the curve, the weight-average molecular weight Mw, and the number-average molecular weight Mn of the polymer were obtained from the data measured. For the detection, used was a differential refraction indicator (RI), for which the wavelength of light was 3.41 μm.

(4) Melting Point, Tm (° C.)

Loaded in a differential scanning calorimeter, Model DSC-7 from Perkin-Elmer, the polymer polypropylene (10 mg±0.05 mg) was heated from room temperature up to 220° C. at a heating rate of 500° C./min, kept at the temperature for 3minutes, then cooled down to 50° C. at a cooling rate of −10° C./min, kept at the temperature for 3 minutes, and again heated up to 190° C. at a heating rate of 10° C./min. In the heat cycle giving a curve for the melting profile of the polymer, the peak appearing in the curve after 150° C. in the second-stage heating step was read, this indicating the melting point, Tm of the polymer.

(5) Test of Test Pieces of Pressed Plate

A plate was formed from the polymer through melt-pressing, and test pieces were blanked out of the plate. The test pieces were tested according to JIS-K7113.

(6) Test of Test Pieces Formed Through Injection Molding

Test pieces formed from the polymer through injection molding were tested for their tensile modulus, flexural modulus, heat deformation temperature (HDT) and Rockwell hardness (HR, in R scale), according to JIS-K7113, JIS-K7203, JIS-K7207 and JIS-K7202, respectively.

The data obtained in the tests are shown in Table 1.

Example 2

The same process as in Example 1 was repeated, except that the degree of hydrogen introduction into the polymerization system was changed to 1.2 kg/cm$^2$G. The test data are in Table 1.

Example 3

The same process as in Example 1 was repeated, except that the degree of hydrogen introduction into the polymerization system was changed to 0.8 kg/cm$^2$G. The test data are in Table 1.

Example 4

The same process as in Example 1 was repeated, except that the degree of hydrogen introduction into the polymerization system was changed to 0.5 kg/cm$^2$G. The test data are in Table 1.

Example 5

The polymer of Example 3 was sheeted into a bi-oriented film. The polymer temperature was 260° C.; the chill roll temperature was 30° C.; the temperature for MD orientation was 140° C.; the draw ratio for MD orientation was 4.6 times the original length; the temperature for TD orientation was 166° C.; and the draw ratio for TD orientation was 9.2 times the original width. The bi-oriented film was subjected to a tensile test according to JIS-K7127, and its tensile modulus was 6500 MPa. The film was subjected to a water vapor permeation test according to the Method B of JIS-K7129, and the water vapor permeation rate through the film was 3.70 g/m$^2$.

Comparative Example 1
(Preparation of Solid Catalyst Component)

A 5-liter three-neck flask equipped with a stirrer was purged with nitrogen gas, and 160 g of diethoxymagnesium and then 600 ml of dewatered heptane were put thereinto in that order. After the mixture was heated at 40° C., 24 ml of silicon tetrachloride was added thereto and stirred for 20 minutes. Then, 25 ml of diethyl phthalate was added thereto. The resulting solution was further heated up to 80° C., and 470 ml of titanium tetrachloride was dropwise added thereto through a dropping funnel. The inner temperature was kept at 110° C., and the compounds were catalytically reacted for 2 hours. The resulting product was fully washed with dewatered heptane at 90° C. 770 ml of titanium tetrachloride was added thereto, and the inner temperature was kept at 110° C. Under the condition, the compounds were catalytically reacted for further 2 hours. After this, the product was fully washed with dewatered heptane at 90° C. Thus was prepared a solid component [B].
(Prepolymerization)

A 1-liter three-neck flask equipped with a stirrer was purged with nitrogen gas, and 48 g of the solid component [B] and then 400 ml of dewatered heptane were put thereinto in that order. This was kept at 10° C., and 2.7 ml of triethylaluminium and 2.0 ml of cyclohexylmethyldimethoxysilane were added thereto. Propylene was introduced into the flask under normal pressure and reacted for 2 hours. After this, the solid component was fully washed with dewatered heptane. Thus was prepared a catalyst component to be used herein.
(Polymerization)

A 10-liter stainless autoclave equipped with a stirrer was fully dried and purged with nitrogen, and 6 liters of dewatered heptane was put thereinto. While stirring, this was heated up to 80° C. To the thus-heated heptane, added were 40.0 mmols of triethylaluminium, then 5.0 mmols of cyclohexylmethyldimethoxysilane, and 0.1 mmols, in terms of Ti, of the solid catalyst component prepared previously, in that order. Then, hydrogen was introduced thereinto to have a hydrogen pressure of 3.0 kg/cm$^2$G, and then propylene was introduced thereinto to have a total pressure of 8.0 kg/cm$^2$G. After the total pressure reached 8.0 kg/cm$^2$G, the monomer was polymerized for 1 hour. Next, the reaction system was cooled and degassed, and the reaction product was taken out of the autoclave. The solvent was removed from the reaction product by the use of an evaporator, and the resulting product was dried in vacuum to obtain polypropylene. The polymer was tested, and the data are in Table 2.

Comparative Example 2

The same process as in Comparative Example 1 was repeated, except that the degree of hydrogen introduction into the polymerization system was changed to 0.5 kg/cm$^2$G. In this, in addition, the polypropylene powder obtained through polymerization was once dried, then heptane was added thereto to reach 200 g/liter, the resulting mixture was stirred at 83° C. for 1 hour, and thereafter the supernatant separated above the mixture was removed while still kept at the elevated temperature, and finally the residue was dried in vacuum to obtain polypropylene. The polymer was tested, and the data are in Table 2.

Comparative Example 3

The same process as in Comparative Example 1 was repeated, except that the degree of hydrogen introduction into the polymerization system was changed to 0.2 kg/cm$^2$G. The test data are in Table 2.

Comparative Example 4

The same process as in Comparative Example 1 was repeated, except that the degree of hydrogen introduction into the polymerization system was changed to 0.07 kg/cm$^2$G. The test data are in Table 2.

Comparative Example 5

The same process as in Comparative Example 1 was repeated, except that the degree of hydrogen introduction into the polymerization system was changed to 0.01 kg/cm$^2$G. The test data are in Table 2.

Comparative Example 6

The polymer of Comparative Example 4 was sheeted simply into a bi-oriented film. The bi-oriented film was subjected to a tensile test according to JIS-K7127, and its tensile modulus was 5800 MPa. The film was subjected to a water vapor permeation test according to the Method B of JIS-K7129, and the water vapor permeation rate through the film was 4.64 g/m$^2$.

TABLE 1

| | Example 1 | Example 2 | Example 3 | Example 4 |
|---|---|---|---|---|
| 0° C. Soluble Content (wt. %) | 1.30 | 0.90 | 0.93 | 0.91 |
| Mp | 82200 | 113200 | 169400 | 512000 |
| Value of Right Side of Formula (1) | 2.55 | 2.41 | 2.24 | 1.78 |
| Melting Point (Tm) (° C.) | 166.4 | 168.2 | 167.9 | 170.2 |
| Value of Right Side of Formula (2) | 165.4 | 166.0 | 166.8 | 168.8 |
| [η] | 1.10 | 1.50 | 1.85 | 2.85 |
| Tensile Modulus <1> (MPa) | 2690 | 2600 | 2540 | 2510 |
| Tensile Modulus <2> (MPa) | 2100 | 2050 | 2020 | 2020 |
| Flexural Modulus (MPa) | 2100 | 2030 | 1990 | 2010 |
| Heat Deformation Temperature (° C.) | 64 | 62 | 62 | 62 |
| Rockwell Hardness | 117 | 114 | 115 | 114 |

Tensile Modulus <1>: Samples produced through pressing.
Tensile Modulus <2>: Samples produced through injection molding.

TABLE 2

|  | Comparative Example 1 | Comparative Example 2 | Comparative Example 3 | Comparative Example 4 | Comparative Example 5 |
|---|---|---|---|---|---|
| 0° C. Soluble Content (wt. %) | 3.16 | 1.65 | 2.49 | 2.25 | 2.21 |
| Mp | 69300 | 86900 | 102200 | 190000 | 534500 |
| Value of Right Side of Formula (1) | 2.62 | 2.52 | 2.46 | 2.19 | 1.76 |
| Melting Point (Tm) (° C.) | 163.4 | 164.9 | 165.8 | 166.5 | 168.5 |
| Value of Right Side of Formula (2) | 165.1 | 165.5 | 165.8 | 167.0 | 168.9 |
| [η] | 0.84 | 1.06 | 1.46 | 1.90 | 2.76 |
| Tensile Modulus <1> (MPa) | 2480 | 2540 | 2330 | 2200 | 2080 |
| Tensile Modulus <2> (MPa) | 1880 | 1910 | 1800 | 1810 | 1830 |
| Flexural Modulus (Mpa) | 1820 | 1830 | 1690 | 1700 | 1730 |
| Heat Deformation Temperature (° C.) | 63 | 61 | 60 | 59 | 58 |
| Rockwell Hardness | 114 | 114 | 112 | 111 | 110 |

Tensile Modulus <1>: Samples produced through pressing.
Tensile Modulus <2>: Samples produced through injection molding.

INDUSTRIAL APPLICABILITY

The novel crystalline polypropylene of the invention is highly rigid, and can be formed into thin and lightweight moldings. Therefore, the invention has the advantages of saving natural resources and realizing high productivity. In addition, since the moldings of the invention are highly rigid and have good heat resistance, they can be substituents for conventional polystyrene and ABS resin moldings. Further, the films of the invention are highly rigid and have good heat a resistance, they are favorable to those for wrapping and packaging eatables, etc.

What is claimed is:

1. A crystalline polypropylene having a 0° C. soluble content α (percent by weight) as measured through programmed-temperature fractionation and a molecular weight Mp, for the peak in the molecular weight distribution curve as measured through gel permeation chromatography which satisfy the relationship in the formula: (1)

$$\alpha \leq -0.42 \times \ln(Mp) + 7.3 \quad (1)$$

and having a melting point Tm (° C.), as measured through differential scanning calorimetry, which with Mp satisfy the relationship in the formula (2):

$$Tm > 1.85 \times \ln(Mp) + 144.5 \quad (2)$$

wherein a ratio of a weight-average molecular weight Mw to a number-average molecular Mn, Mw/Mn, as measured through gel permeation chromatography, is at most 6.5.

2. The crystalline polypropylene of claim 1, having an intrinsic viscosity [η] as measured in tetralin solvent at 135° C. which is between 0.5 and 4.0 dl/g.

3. The crystalline polypropylene of claim 1, having a molecular weight Mp, for the peak in the molecular weight distribution curve as measured through gel permeation chromatography, of at least 10,000.

4. The crystalline polypropylene of claim 1, wherein a and Mp satisfy the relationship in the formula:

$$\alpha \leq -0.42 \times \ln(Mp) + 6.8.$$

5. The crystalline polypropylene of claim 4, wherein a and Mp satisfy the relationship in the formula:

$$\alpha \leq -0.42 \times \ln(Mp) + 6.3.$$

6. The crystalline polypropylene of claim 1, wherein Tm and Mp satisfy the relationship in the formula:

$$Tm > 1.85 \times \text{Ln}(Mp) + 145.0.$$

7. The crystalline polypropylene of claim 1, wherein Mw/Mn is at most 5.5.

8. The crystalline polypropylene of claim 2, wherein the intrinsic viscosity [η] is between 0.5 and 3.0 dl/g.

9. The crystalline polypropylene of claim 3, wherein Mp is at least 30,000.

10. The crystalline polypropylene of claim 9, wherein Mp is at least 50,000.

11. A molding of the crystalline polypropylene of claim 1.

12. The molding of claim 11, which is an interior finishing for a car.

13. The molding of claim 11, which is a housing for an electric appliance.

14. A film of the crystalline polypropylene of claim 1.

15. The film of claim 14, which is biaxially oriented.

16. The film of claim 14, which is surface treated by corona discharge, chromate treatment, flame exposure, hot air-exposure, ozone or UV-exposure, sand blasting or solvent treatment.

* * * * *